Jan. 24, 1928.  
C. H. BARTLETT  
BOOKHOLDER  
Filed Aug. 27, 1926
1,657,343
2 Sheets-Sheet 1
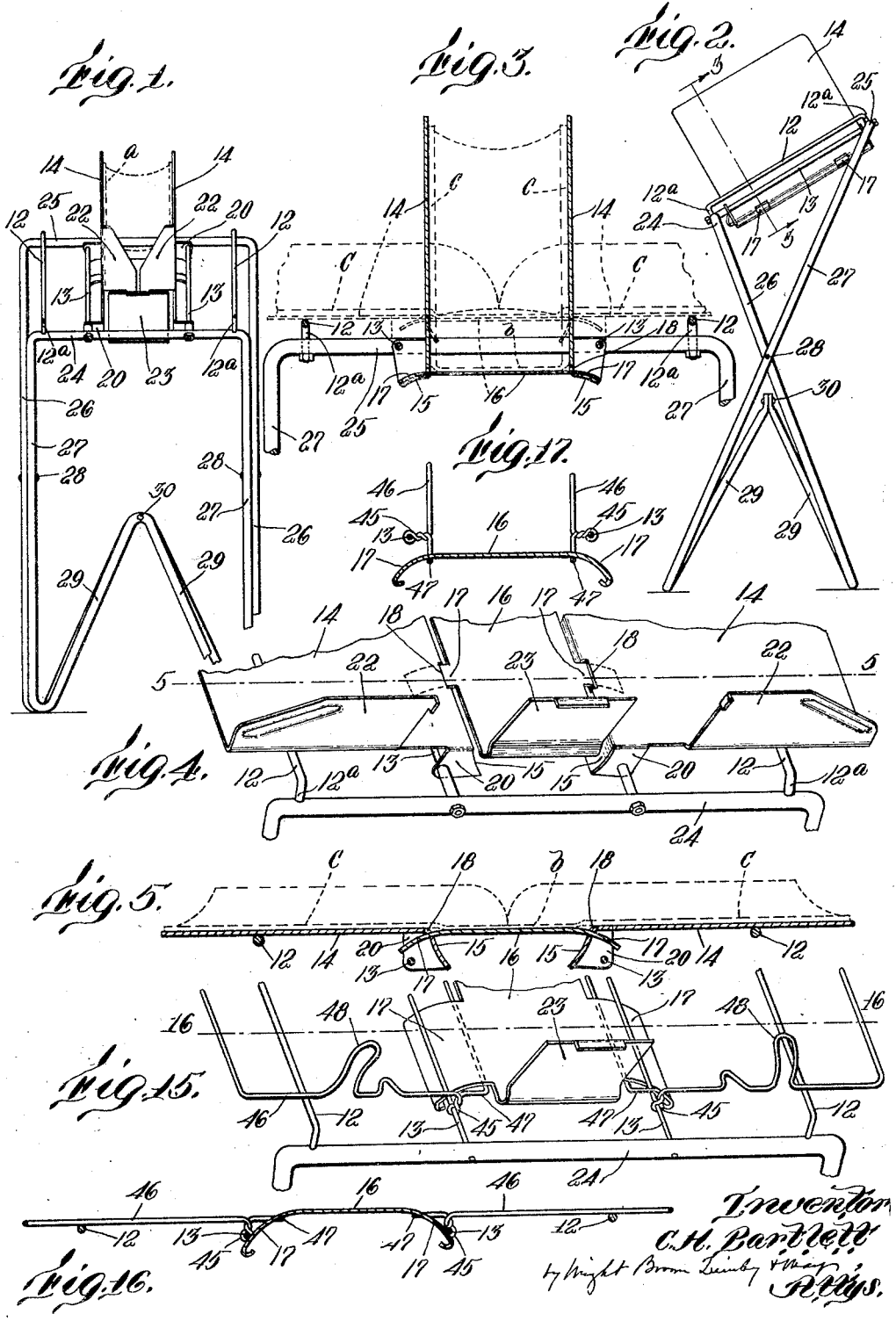

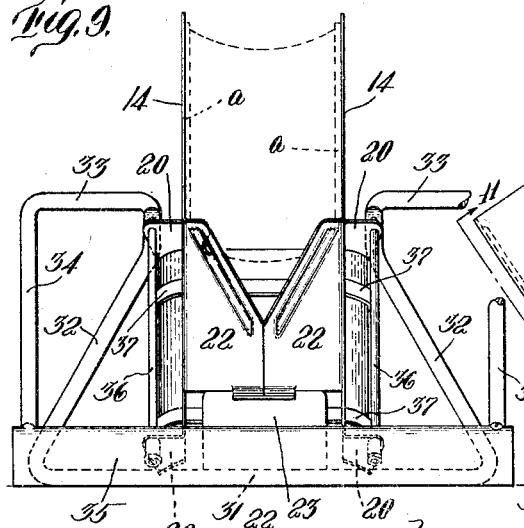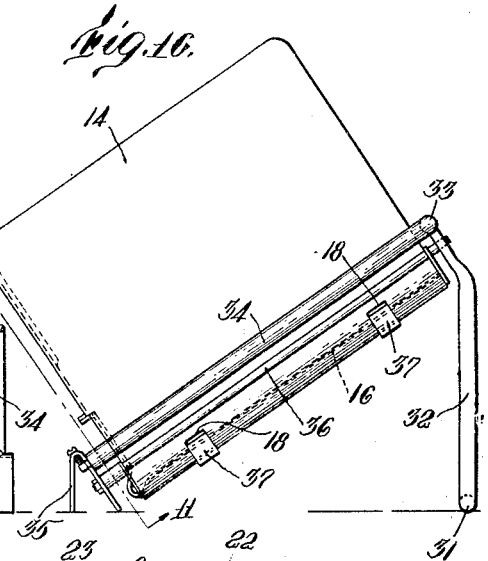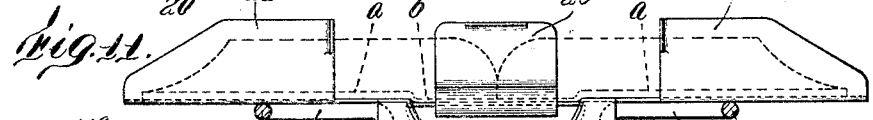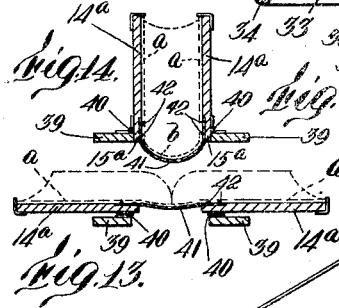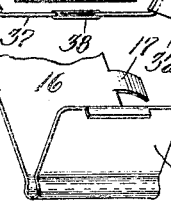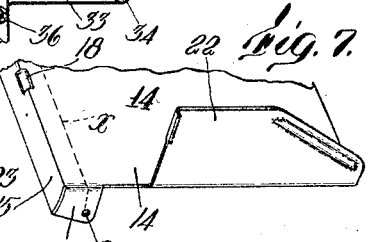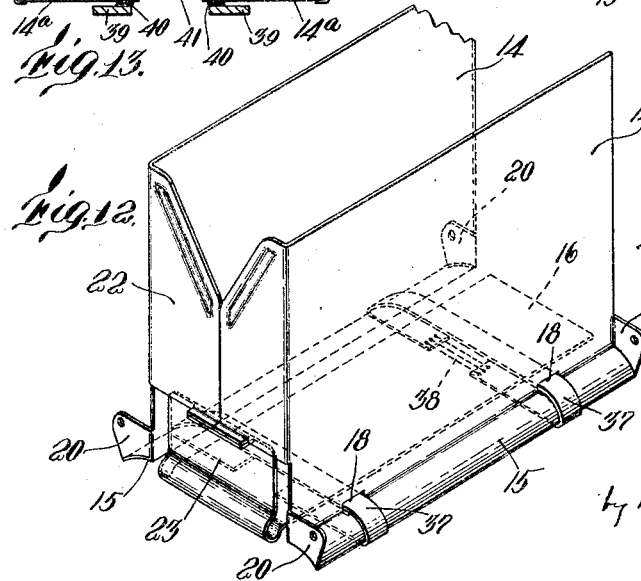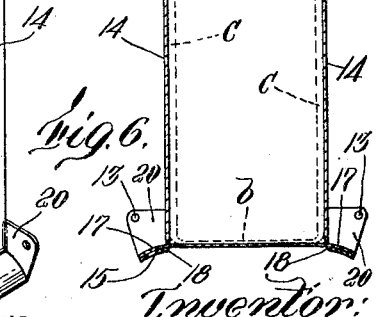

Patented Jan. 24, 1928.

1,657,343

UNITED STATES PATENT OFFICE.

CHARLES H. BARTLETT, OF BOSTON, MASSACHUSETTS.

BOOKHOLDER.

Application filed August 27, 1926. Serial No. 131,890.

The object of this invention is to provide a holder for a large and heavy book, adapted to support the book when opened, and when closed, and to releasably confine it when closed, and to permit an easy opening and closing of the book, and a secure retention of the book on the holder, so that the book is not liable to be accidentally displaced.

Of the accompanying drawings forming a part of this specification,—

Figure 1 is an end view of a book-holder embodying the invention, adjusted to hold a book closed.

Figure 2 is a side view of the same.

Figure 3 is a section on line 3—3 of Figure 2, the holder being shown by dotted lines adjusted to hold a book open.

Figure 4 is a fragmentary perspective view, showing portions of the levers and stirrup hereinafter described, adjusted to hold a book open.

Figure 5 is a section on line 5—5 of Figure 4.

Figure 6 is a view similar to Figure 5, showing the levers and stirrup adjusted to hold a book closed.

Figure 7 is a fragmentary perspective view, showing a portion of one of the levers.

Figure 8 is a fragmentary perspective view, showing a portion of the stirrup.

Figures 9, 10, 11 and 12 show a somewhat different embodiment of the invention, Figure 9 being an end view, Figure 10 a side view, Figure 11 a view similar to Figure 9, showing a different adjustment, and Figure 12 a perspective view.

Figures 13 and 14 are fragmentary sectional views, showing a modification.

Figures 15, 16 and 17 are views similar to Figures 4, 5 and 6, showing another embodiment of the invention, Figure 16 being a section on line 16—16 of Figure 15.

The same reference characters indicate the same parts in all of the figures.

The embodiment of the invention shown by Figures 1 to 8, inclusive, comprises a stand described in detail hereinafter, two spaced apart lever rests 12, supported by the stand and inclined as shown by Figure 2, and fulcrum members 13, supported by the stand between the rests and offset therefrom, the fulcrum members being inclined like the rests 12.

Mounted to swing on the fulcrum members 13, are two book cover-supporting levers, each having a longer arm 14, and a shorter arm 15. The levers are adapted to swing on the fulcrum members, so that the longer arms 14 may bear on the rests 12, in alinement with each other on a common plane, as best shown by Figures 4 and 5, and may be raised from the rests, so that the longer arms stand parallel with each other, as shown by Figure 6.

The longer arms conform to the covers $c$ of a book, and are preferably metal plates, of an area somewhat greater than that of the covers $c$.

16 designates a book back-supporting stirrup interposed between and engaged with the shorter arms. In this, the preferred embodiment of the invention, the stirrup is an oblong metal plate, having at its opposite longitudinal edges oppositely projecting tongues 17, adapted to slide in slots 18 in the shorter arms 15.

The arrangement is such that when the longer arms bear on the rests 12, as shown by Figures 4 and 5, the stirrup 16 is raised, so that the stirrup and longer arms are adapted to support an opened book, and when the longer arms are parallel with each other, as shown by Figure 6, the stirrup is lowered and supports the back $b$ of the book and the entire weight of the latter, the longer arms 14 being maintained by the weight of the book in position to confine the book in the closed condition shown by dotted lines in Figure 6.

The preferred formation of the levers is clearly shown by Figures 4 to 8, inclusive, each lever having ears 20, at its opposite ends, having holes 21 to receive the fulcrum members 13. The lever portion shown at the right of the dotted line $x$ in Figure 7, is the longer arm, and the portion shown at the left of said line, is the shorter arm, the shorter arm being of somewhat angular form, and the arrangement of the slots 18 being as clearly shown by Figure 7.

It will now be seen that the operation of opening and closing a book supported by the holder, may be very easily performed, the operator grasping the outer edge portions of the longer arms 14, and swinging the same to a bearing on the rests 12, to open the book, and to the upright position shown by Figure 6, to close the book. The tongues 17 of the stirrup slide in the slots 18, both when the book is being opened, and when it is being closed, the stirrup being raised when the book is opened, as shown by Figures 4 and 5, and lowered when the book is closed, as shown by Figure 6.

The longer arms 14 are provided at their lower ends with cover-end stops 22, arranged to prevent downward endwise displacement of a book, both when the latter is open and closed. The lower end of the stirrup 16 is provided with a stop 23, for the book back b. The stops 22 are spaced outwardly from the stirrup and form a recess above the stirrup when the levers are in book-closing position, the stop 23 projecting into said recess, as shown by Figures 1, 9 and 12. The stops are preferably flanges integral with the longer arms 14 and stirrup 16, and the arrangement is such that when the levers are adjusted to close the book, the stops 22 are arranged beside each other, edge to edge, and above the stop 23, as shown by Figure 1. The stops, therefore, collectively prevent endwise displacement of a book, both when it is open and closed.

The stand shown by Figures 1, 2 and 3, includes bent metal rods having transverse portions 24 and 25, standard portions 26 and 27, crossing each other and connected by rivets 28, and inclined end portions 29, which meet and are connected by a fastener 30. Said portions may be formed by bending metal rods and securing them together. The rests 12 in this instance, are metal rods having bent end portions 12ª secured in any suitable way to the transverse portions 24 and 25 of the stand. The fulcrum members 13 may also be metal rods, secured at their opposite ends to the transverse portions 24 and 25 and offset below the top members 12. The stand above described is particularly adapted to rest on a floor.

In the embodiment shown by Figures 9 to 12, inclusive, the stand is composed of a bent metal rod having a central portion 31, two inclined portions 32, transverse portions 33, and inclined portions 34 extending forward and downward from the portions 33, to a transverse member 35, which is approximately V-shaped in cross section, as shown by Figure 10. In this instance, the inclined portions 34 constitute the lever rests of the stand, supporting the longer arms of the levers previously described, when the levers are adjusted to support an open book. The fulcrum members, in this instance, are rods 36 fixed at their upper ends to the portions 32, and at their lower ends to the member 35. The stand thus formed is particularly adapted for use on a desk or table.

In this embodiment of the invention, the levers are formed substantially as described with reference to Figures 1 to 7, but the stirrup is differently constructed and composed of a plurality of flexible straps 37, two in this instance, the straps being passed through the slots 18, in the shorter arms 15, and across said arms, the ends of the straps being connected by lacings 38 (Figures 11 and 12) or other suitable means. The straps 37 constitute flexible stirrup sections, and the operation of the holder is substantially as above described.

Figures 13 and 14 show a simple modification, in which 39, 39 designate the lever rests of the stand, which may be supported in any suitable way. The levers are flat members, connected by hinges 40, with the inner portions of the rests 39, the pintles of the hinges constituting the fulcrum members.

The longer arms 14ª of the levers project in one direction, and the shorter arms 15ª project in the opposite direction from the fulcrums or hinge pintles. The stirrup is composed of flexible straps 41, secured at 42 to the levers. The arrangement is such that when the longer arms are upright and parallel with each other, the shorter arms abut against the inner edges of the rests 39, as shown by Figure 14. When the longer arms are swung outward and bear on the rests 39, the straps 41 are raised, as shown by Figure 13.

The levers may be of wire, as shown by Figures 15, 16 and 17, which correspond with Figures 4, 5, and 6. Each lever is a frame of bent wire including twisted offset portions or ears 45, having eyes adapted to turn on the fulcrum members 13. The ears 45 constitute portions of the longer lever arms 46, and portions of the shorter lever arms 47. In this embodiment of the invention, the tongues 17 of the stirrup 16, instead of entering slots 18 in the shorter lever arms, bear on the upper sides of the shorter arms 47, and on the under sides of the fulcrum members 13, when the levers are adjusted as shown by Figures 15 and 16, and continue to bear on the shorter arms 47, but are depressed below the fulcrum members 13 when the levers are adjusted as shown by Figure 17. The stirrups are, therefore, raised when the levers are adjusted to support an open book, and depressed when the levers are adjusted to close the book. The end stops on the longer arms are formed by loops 48. The stirrup tongues 17 may be formed to abut against portions of the wire levers, and thus prevent endwise displacement of the stirrups. Figure 15 shows the lower tongues 17 abutting against the lower portions of the wire levers. It will be understood that the upper tongues 17, not shown by Figure 15, similarly abut against the upper portions of the wire levers.

It will be seen that the fulcrum members are supported by the stand in fixed relation to each other and to the stand. The structure is therefore more simple and less expensive than would be the case if the fulcrum members were supported by means requiring relative movement of the fulcrum members, when the holder is being operated to open or close a book. The fulcrum members pivotally connect the levers directly with the stand and form parallel axes on which the levers are adapted to swing upwardly in parallel planes from the central portion of the stand, as shown by Figure 3, and outwardly in a common plane, as shown by Figures 4 and 5. The book back-supporting stirrup is engaged with the outer ends of the shorter arms of the levers, so that when the levers are in a common plane, the stirrup is raised and contacts with the back $b$ of the book, and when the levers are in parallel planes, the entire weight of the book is transferred to the stirrup and holds the levers in book-closing positions, from which they may be moved to book-opening positions by slight force exerted on the free ends of the longer arms.

The fixed lever rests are adapted to cooperate with the fulcrum members in supporting the levers in a common plane.

I claim:

1. A book-holder comprising, in combination, a stand, parallel disposed fulcrum members supported by the stand in fixed relation to each other and to the stand, a pair of levers pivotally connected to the fulcrum members and arranged to bear on the covers of a book, each of said levers comprising a long arm projecting outwardly from the fulcrum member, and a shorter arm projecting inwardly therefrom, a back supporting stirrup between said levers, and means connecting the stirrup with the levers whereby when the levers are in the book-opening position the stirrup will be raised and when the levers are in the closed position the stirrup will be depressed and will support the entire weight of the book.

2. A book-holder comprising, in combination, a stand, parallel disposed fulcrum members supported by the stand in fixed relation to each other and to the stand, a pair of levers pivotally connected to the fulcrum members and arranged to bear on the covers of a book, each of said levers comprising a long arm projecting outwardly from the fulcrum member, and a shorter arm projecting inwardly therefrom, rest members connected to the stand and cooperating with the fulcrum members for supporting the levers in their open position, a back supporting stirrup, between said levers, and means connecting the stirrup with the levers whereby when the levers are in the book-opening position the stirrup will be raised and when the levers are in the closed position the stirrup will be depressed and will support the entire weight of the book.

3. A book-holder comprising, in combination, a stand, parallel disposed fulcrum members supported by the stand in fixed relation to each other and to the stand, a pair of levers pivotally connected to the fulcrum members and arranged to bear on the covers of a book, each of said levers comprising a long arm projecting outwardly from the fulcrum member and a shorter arm projecting inwardly therefrom, a back supporting stirrup, between said levers, the longer arms being provided with stops spaced outwardly from the stirrup and forming a recess about the stirrup when the levers are in the book closing position, the stirrup having a stop arranged to project into said recess, and means connecting the stirrup with the levers whereby when the levers are in the book-opening position the stirrup will be raised and when the levers are in the closed position the stirrup will be depressed and will support the entire weight of the book.

4. A book-holder comprising, in combination, a stand, parallel disposed fulcrum members supported by the stand in fixed relation to each other and to the stand, a pair of levers pivotally connected to the fulcrum members and arranged to bear on the covers of a book, each of said levers comprising a long arm projecting outwardly from the fulcrum member, and a shorter arm projecting inwardly therefrom, and a back supporting stirrup between said levers, said stirrup having lateral tongues loosely extending through complementary formed openings in the adjacent wall of said levers, whereby the stirrup is raised by the movement of the levers to their book opening position and depressed by movement of the said levers when moved to their book closing positions.

In testimony whereof I have affixed my signature.

CHARLES H. BARTLETT.